US007591062B2

(12) United States Patent
Rogers

(10) Patent No.: US 7,591,062 B2
(45) Date of Patent: Sep. 22, 2009

(54) CUTTING ASSEMBLIES AND METHODS

(76) Inventor: James Rogers, 3501 W. 6th, Spokane, WA (US) 99224

( * ) Notice: Subject to any disclaimer, the term of this patent is extended or adjusted under 35 U.S.C. 154(b) by 671 days.

(21) Appl. No.: 11/357,003

(22) Filed: Feb. 16, 2006

(65) Prior Publication Data

US 2007/0186405 A1 Aug. 16, 2007

(51) Int. Cl.
*B23P 23/00* (2006.01)

(52) U.S. Cl. .......................... 29/560; 29/27 A; 142/40; 142/48; 144/12; 144/1.1; 269/288

(58) Field of Classification Search .................. 29/560, 29/27 A, 27 C, 27 R; 142/48, 49, 55, 40, 142/32, 31, 1, 26, 57, 54; 82/115, 128, 162; 144/12, 30, 125, 2.1, 1.1, 3.1; 83/733, 444; 269/287, 288, 43, 291
See application file for complete search history.

(56) References Cited

U.S. PATENT DOCUMENTS

| | | | | |
|---|---|---|---|---|
| 113,464 | A | 4/1871 | Sweet | |
| 240,584 | A | 4/1881 | Elliott | |
| 271,702 | A | 2/1883 | Griggs | |
| 369,262 | A | 8/1887 | Sargent | |
| 975,946 | A | 11/1910 | Gilliam | |
| 1,235,393 | A | 7/1917 | Stanwood et al. | |
| 1,744,697 | A | 1/1930 | Granger | |
| 2,503,926 | A | 4/1950 | Tobias | |
| 2,529,018 | A | 11/1950 | Hancharik | |
| 2,681,086 | A | 6/1954 | Degen | |
| 2,715,924 | A | 8/1955 | Norris | |
| 2,780,253 | A | 2/1957 | Joa | |
| 2,918,953 | A * | 12/1959 | Wraight | 144/253.1 |
| 3,234,974 | A | 2/1966 | Ray | |
| 3,242,691 | A | 3/1966 | Robinson et al. | |
| 3,512,561 | A | 5/1970 | Cortez | |
| 3,712,174 | A | 1/1973 | Granfield | |
| 4,024,898 | A | 5/1977 | Bergler et al. | |
| 4,061,165 | A * | 12/1977 | Harwood et al. | 144/1.1 |
| 4,099,552 | A | 7/1978 | Dyball | |
| 4,167,953 | A | 9/1979 | Carlstrom | |
| 4,200,129 | A | 4/1980 | Sneed, Jr. | |
| 4,279,554 | A | 7/1981 | Seidenfaden | |
| 4,455,907 | A | 6/1984 | Bassett | |

(Continued)

OTHER PUBLICATIONS

Yates-American Machine Company Catalog Advertisement, "No. 1022 Hand Feed Dowel Machine" pp. 283.

(Continued)

*Primary Examiner*—Erica E Cadugan
(74) *Attorney, Agent, or Firm*—Wells St. John P.S.

(57) ABSTRACT

Cutting assemblies are disclosed that include an entrance portion and a receiving portion, with the receiving portion defining a receiving opening configured to be axially aligned with an entrance opening of the entrance portion when mounted to the surface of a cutting apparatus. Cutting assemblies are also provided that include a material carriage configured to be borne by a cutting apparatus. Cutting assemblies that include a material receiving portion configured to be slidably mounted to a surface of a cutting apparatus are also disclosed. Cutting methods are also disclosed that can include rotating a piece of material around the materials longitudinal axis and delivering the material to a cutting tool while the longitudinal axis of the material is aligned substantially opposite the direction of rotation of the cutting tool.

9 Claims, 11 Drawing Sheets

U.S. PATENT DOCUMENTS

| | | | | | |
|---|---|---|---|---|---|
| 4,460,532 | A | | 7/1984 | Cornell | |
| 4,504,178 | A | | 3/1985 | Seidenfaden | |
| 4,516,612 | A | * | 5/1985 | Wiley | 144/1.1 |
| 4,538,945 | A | | 9/1985 | Gödecke et al. | |
| 4,553,575 | A | | 11/1985 | Brown | |
| 4,630,660 | A | | 12/1986 | McGuire | |
| 4,674,548 | A | | 6/1987 | Mills et al. | |
| 4,678,903 | A | | 7/1987 | Wlodarczyk et al. | |
| 4,765,599 | A | | 8/1988 | Ferrari | |
| 4,768,903 | A | | 9/1988 | Merritt, Jr. | |
| 4,848,422 | A | * | 7/1989 | Chiantella | 142/37 |
| 4,865,300 | A | * | 9/1989 | Borzym | 269/13 |
| 4,915,149 | A | * | 4/1990 | Herenyi et al. | 144/84 |
| 5,019,057 | A | | 5/1991 | Truckai | |
| 5,065,802 | A | | 11/1991 | Peterson | |
| 5,127,452 | A | | 7/1992 | Wilston | |
| 5,176,660 | A | | 1/1993 | Truckai | |
| 5,282,408 | A | | 2/1994 | Shiotani et al. | |
| 5,515,894 | A | * | 5/1996 | Dunn | 144/1.1 |
| 5,526,849 | A | | 6/1996 | Gray | |
| 5,597,023 | A | | 1/1997 | Heintzeman | |
| 5,611,374 | A | | 3/1997 | Blin et al. | |
| 5,655,583 | A | * | 8/1997 | Heintzeman | 144/204.2 |
| 6,082,722 | A | * | 7/2000 | Cvijanovic | 269/287 |
| 6,263,921 | B1 | | 7/2001 | He | |
| 6,263,929 | B1 | * | 7/2001 | Aziz et al. | 142/31 |
| 6,293,320 | B1 | * | 9/2001 | McGregor, II | 144/1.1 |
| 6,698,476 | B2 | * | 3/2004 | Baculy | 144/145.1 |
| 6,799,615 | B2 | * | 10/2004 | Smith | 144/203 |
| 2004/0060403 | A1 | * | 4/2004 | Pace | 82/162 |

OTHER PUBLICATIONS

Yates-American Machine Company Catalog Advertisement, “No. 10251 Chucking Arbor” pp. 283.

Yates-American Machine Company Catalog Advertisement, “No. 1015 Rod and Dowel Machine”.

* cited by examiner

CUTTING ASSEMBLIES AND METHODS

TECHNICAL FIELD

The present disclosure relates generally to material processing assemblies and methods and, in exemplary embodiments, to cutting assemblies and methods.

BACKGROUND OF THE INVENTION

Materials, such as wooden materials, are typically required to be rounded for decorative and structural purposes. For example, dowels may be required to complete the joinery of boards, tennons may be required to complete coupling of materials, and/or rounding may be desired to obtain a certain decorative appearance. The rounding of material has been performed industrially for years. Typically material is provided to multiple sets of cutting blades of an industrial device while the material is maintained in substantially fixed position without rotation. Material can also be rounded manually in time consuming fashion using hand tools or even power hand tools.

SUMMARY OF THE DISCLOSURE

In accordance with exemplary embodiments, cutting assemblies are disclosed that can include an entrance portion having a first base, with the entrance portion defining an entrance opening configured to receive a piece of material within the opening. The first base of the entrance portion can be configured to be mounted to the upper surface of a multi-toothed cutting apparatus, for example. The cutting assemblies can also include a receiving portion having a second base, with the receiving portion defining a receiving opening configured to be axially aligned with the entrance opening of the entrance portion when mounted to the upper surface of the multi-toothed cutting apparatus. In at least one exemplary implementation, the second base of the receiving portion can include a groove extending at least partially into the second base, with the groove configured to receive a cutting tool of the multi-toothed cutting apparatus when the receiving portion is mounted to the upper surface.

Cutting assemblies are also provided that can include a material carriage having a first mounting portion coupled to a second mounting portion, the carriage configured to be borne by a cutting apparatus having an upper surface and a cutting tool extending above the upper surface. The carriage can be configured to be moveable along the surface of the cutting apparatus relative to the cutting tool, for example. The cutting assembly can also include a first mounting apparatus coupled to the first mounting portion with the first mounting apparatus configured to receive a first end of a piece of material, the piece of material having a second end extending to the first end. A second mounting apparatus aligned with the first mounting apparatus can also be included with the second mounting apparatus being coupled to the second mounting portion, and configured to receive the second end of the piece of material. According to exemplary implementations, both the first and second apparatus can be configured to allow axial rotation of the material around a longitudinal axis extending from the first end to the second end of the material.

Exemplary cutting assembly embodiments can include a material receiving portion configured to be slidably mounted to a surface of a cutting apparatus having a cutting tool extending above the surface. The receiving portion can include a material receiving apparatus configured to couple to a piece of material, with the apparatus further configured to allow the material to rotate around an axis extending from the material to the apparatus, for example. According to exemplary implementations, a resistance apparatus can be coupled to the receiving portion and configured to be rigidly affixed to the cutting assembly. The resistance apparatus can be configured to bias the receiving portion toward the cutting tool, for example.

According to exemplary embodiments of the disclosure cutting methods are disclosed that can include providing a piece of material having a longitudinal axis extending from a distal end of the material to a proximal end of the material. Cutting methods can also include providing a multi-toothed cutting apparatus utilizing a circular cutting tool having four or more teeth, individual ones of the teeth having a face and the cutting apparatus configured to rotate the cutting tool in a first direction outward from the face of the teeth. The longitudinal axis of the material can be aligned in a second direction substantially opposite the first direction, for example, and the material can be rotated around the longitudinal axis and delivered to the cutting tool while the material is aligned substantially opposite the first direction.

BRIEF DESCRIPTION OF THE DRAWINGS

Preferred embodiments of the invention are described below with reference to the following accompanying drawings.

DESCRIPTION OF THE DISCLOSURE

This disclosure of the invention is submitted in furtherance of the constitutional purposes of the U.S. Patent Laws "to promote" the progress of science and useful arts" (Article 1, Section 8).

The present disclosure provides cutting assemblies and methods at can be used to process starting materials. These starting materials can include wood materials, as well as other materials suitable for processing, including but not limited to polymeric materials such as plastics. The starting materials can include processed or unprocessed materials. For example, wood materials can include branches such as trimmed branches, as well as rough-cut or even finish-cut lumber. According to exemplary embodiments, the starting materials include all materials suitable for processing using a cutting tool configured to remove at least a portion of the starting material.

The processing of the starting materials can include the removal of portions of the starting materials to produce a product having a different size and/or shape than the starting materials, for example. According to exemplary implementations, the starting material can include corners, edges, and/or extensions that may be one or more portions of the product to be removed during the processing. The processing of starting materials can include processing the entirety of the starting materials as well as portions of the starting materials. For example, portions of the starting materials may be removed from an entirety of the length of starting materials in exemplary implementations and in other exemplary implementations portions of the starting materials may be removed from predetermined areas of the starting materials, such as an end of the starting material.

As just one example, the starting material can include a processed piece of material, such as lumber having corners in one cross section that when processed in accordance with exemplary embodiments of the disclosure results in product that is rounded in the one cross section. According to exemplary embodiments, a dowel can be the product prepared from the starting material. As another example, the starting material can include a branch having extensions such as smaller branches in one cross section that when processed in accordance with exemplary embodiments of the disclosure results in product that is rounded in the one cross section. As still another example, the starting material can include a processed piece of material, such as a dowel, having one circumference in one cross section that when processed in accordance with exemplary embodiments of the disclosure results in product having another circumference, smaller than the one circumference, in the one cross section.

Figure 1:
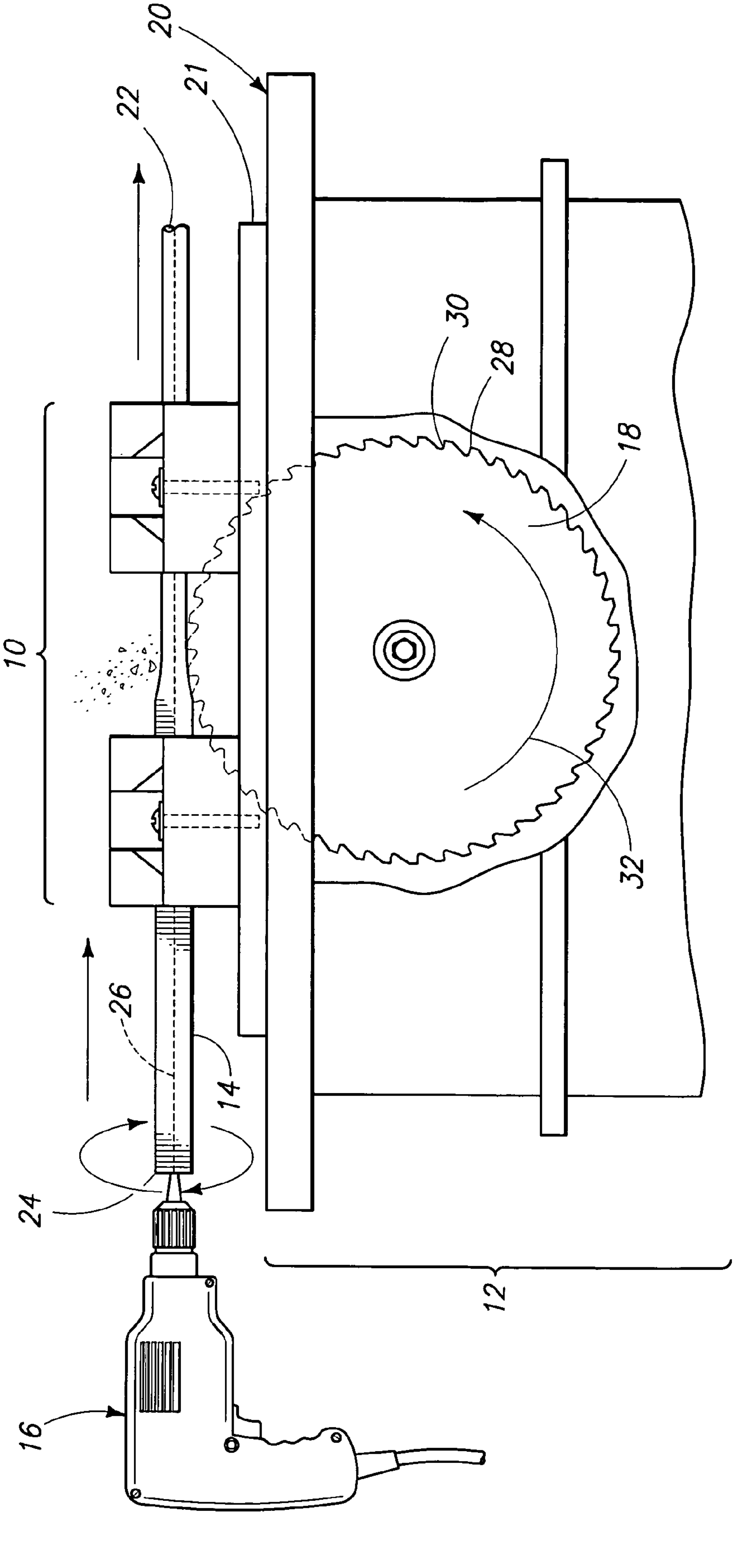
FIG. 1 is a cutting assembly according to an embodiment.

Exemplary cutting assemblies and methods are described with reference to FIGS. 1-11. Referring first to FIG. 1, a cutting assembly 10 and a cutting apparatus 12 are shown. Cutting assembly 10 can be configured to mount to cutting apparatus 12. Cutting apparatus 12 can include a multi-toothed cutting apparatus, for example. Referring to FIG. 1 for example, cutting apparatus 12 includes a cutting tool 18. Cutting tool 18 can be multi-toothed, having at least 4 or more teeth, for example. Tool 18 can also be referred to as a blade, in exemplary embodiments. Tool 18 can be circular as shown, and individual teeth 28 of cutting tool 18 can have a face 30. Cutting apparatus 12 can be configured to rotate tool 18 in a direction 32 outward from face 30 of teeth 28. As an example, cutting apparatus 12 can be configured as a table saw rotating a saw blade in a direction toward material to be cut. Exemplary embodiments of cutting apparatus 12 can include table saws and/or shaping devices. Table saws can be equipped with a circular cutting blade having multiple teeth. Cutting apparatus 12 can include a table saw, and cutting tool 18 can include a circular blade of the table saw. Exemplary blades that can be useful are cross-cut and/or plywood cutting blades, blades that typically have many fine teeth as apposed to ripping blades that can have larger and less teeth than cross-cut or plywood cutting blades.

According to exemplary embodiments cutting apparatus 12 is commercially available, and can include a cutting surface 20. In exemplary configurations, apparatus 12 can be configured to extend cutting tool 18 through a groove (not shown) within surface 20. Cutting apparatus 12 can be configured to allow an operator to raise and lower cutting tool 18 within this groove above surface 20, for example.

According to at least one exemplary embodiment, a material 14 can be provided through cutting assembly 10 as shown in FIG. 1. Material 14 can be wood, for example. Material 14 can have a longitudinal axis 26 extending from an end 22 to another end 24. In exemplary embodiments, end 22 can be referred to as the distal end of material 14, and end 24 can be referred to as the proximal end of material 14. Between ends 24 and 22 can extend longitudinal axis 26 of material 14.

Referring to cutting apparatus 12, cutting tool 18 as described above includes a plurality of teeth 28. Individual ones of teeth 28 can include a face 30. In exemplary embodiments, the rotation 32 of cutting tool 18 is aligned in such a fashion that the rotation is outwardly from face 30 of teeth 28. In exemplary embodiments, the longitudinal axis 26 of material 14 can be aligned in a direction substantially opposite to the direction of the rotation 32 of tool 18. According to exemplary embodiments, material 14 can be rotated around longitudinal axis 26 in a rotation direction 24 using a rotation apparatus 16. Rotation apparatus 16 can be a hand drill or commercially available drill that is configured with a coupling assembly to material 14. The exemplary coupling assemblies can include auger drives, including but not limited to a screw configured to be received by an opening within end 24 of material 14. The coupling assembly can be mounted exteriorly to end 24 of material 14 as well. Such coupling assemblies can include a grasping bit that is configured to encompass any and all corners or projections of end 24 of material 14. Exemplary bits include those known to persons of ordinary skill in the art such as square socket drivers. According to exemplary embodiments, material 14 can be rotated in direction 24 via rotating apparatus 16, and the operator of rotating apparatus 16 can deliver material 14 to cutting tool 18 while aligning material 14 substantially opposite to rotation 32 of tool 18.

Figure 2:
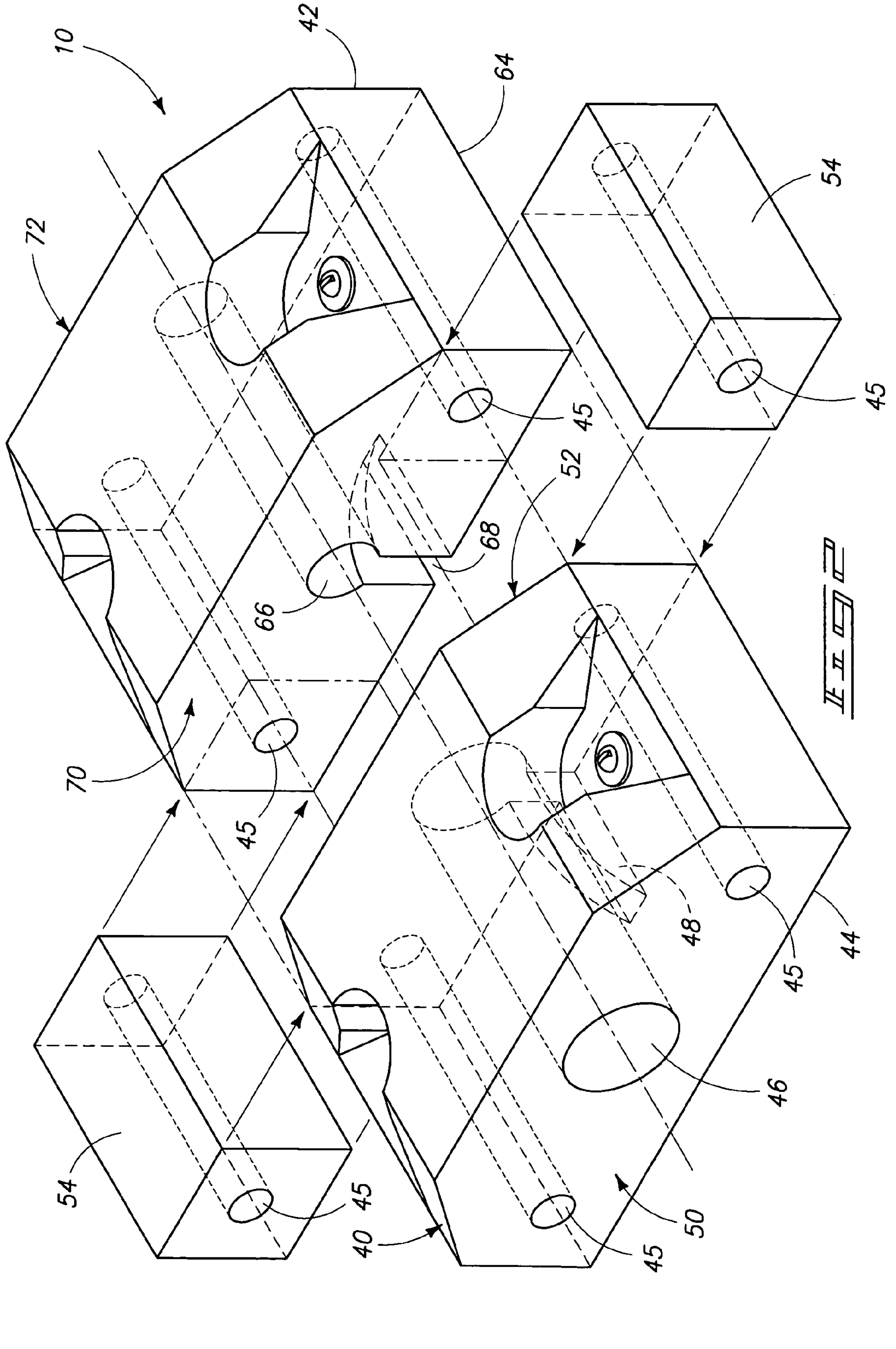
FIG. 2 is the cutting assembly of FIG. 1 according to an embodiment.

Referring to FIG. 2, exemplary cutting assembly 10 can include an entrance portion 40 and a receiving portion 42. Entrance portion 40 can include a base 44, and define an opening 46 configured to receive a piece of material 14 (see FIG. 1) therein. In exemplary embodiments, base 44 can be configured to be mounted to upper surface 20 of an exemplary cutting apparatus, such as cutting apparatus 12 of FIG. 1. Base 44 can include a substantially flat bottom in exemplary embodiments, or can include projections configured to be received by openings within the surface of a cutting apparatus. Exemplary openings of the cutting surface of a cutting apparatus include those openings configured to receive a miter gauge, for example. Assembly 10 can be configured to be mounted to a cutting apparatus and aligned with the cutting tool of the apparatus. For example, when aligned, the cutting tool can be configured to rotate in the direction of entrance portion 40. Portion 40 can also be aligned facing the face of the teeth of the cutting tool.

In particular embodiments, longitudinal axis 26 of material 14 can be aligned to substantially oppose rotation 32 of tool 18. An exemplary method for aligning material 14 in this manner can include inserting the distal end of material 14 to within opening 46 defined by entrance portion 40 when coupled to cutting apparatus 12, for example. Opening 46 can be configured to allow for the rotation around longitudinal axis 26 of material 14. Opening 46 can have various sizes to accommodate typically unrounded or square-edged material 14. These sizes can include sizes to facilitate the receipt of standard-sized materials. Such standard-sized materials include 1×1, 2×2, and 4×4 pieces of material. Material may also be un-square or rectangular in cross section, such as a 1×2 and up to and including a 2×4. Material 14 may also include roughened materials such as and including branches and other materials that have not been rough sawn.

According to exemplary embodiments of assembly 10, entrance portion 40 can further include a groove 48 that can extend from opening 46 to base 44 of entrance portion 40. Groove 48 can also extend the entire length of base 44 of entrance portion 40 from a proximal end 50 to a distal end 52. In alternative embodiments, groove 48 may extend from the distal end 52 of entrance portion 40 to within base 44 but need not necessarily extend to within opening 46. According to exemplary embodiments, groove 48 can be configured to receive cutting tool 18 when assembly 10 is mounted to cutting apparatus 12.

Assembly 10 can also include separation guides 54, for example. Separation guides 54 can be configured to couple entrance portion 40 with receiving portion 42 in exemplary embodiments. Separation guides 54 can be of various lengths, depending on the use of the assembly, the material being processed, and/or the cutting apparatus being utilized. For example, where a larger amount of material from material 14 needs to be removed during processing, it may be necessary to separate entrance portion 40 from receiving portion 42 to perform the exemplary processing.

Receiving portion 42 can be aligned with entrance portion 40 according to exemplary embodiments. Receiving portion 42 can have a base 64, as well as a proximal end 70 extending to a distal end 72. Receiving portion 42 can define an opening 66 that extends the length of the receiving portion in exemplary embodiments. Receiving portion 42 can also have a groove 68 extending from base 64 to opening 66. Opening 66 and opening 46 can be aligned in exemplary embodiments along a longitudinal axis to receive material 14. According to exemplary embodiments, opening 66 can be substantially smaller than opening 46. For example, and by way of example only, where a piece of material has a certain diameter or cross-section being fed into opening 46 of entrance portion 40, the material, after passing by cutting tool 18, for example, will be substantially smaller after having material removed during processing. The remaining material, after it passes by cutting tool 18, can be received by opening 66 within receiving portion 42.

In exemplary implementations, material 14 can be maintained along its longitudinal axis, substantially opposing the rotating direction of cutting tool 18. The raising and lowering of cutting tool 18 within cutting apparatus 12 can allow for the material to be rounded to a certain degree and fit within a predefined opening 66. Referring to FIG. 1, material 14 in exemplary embodiments can be provided to opening 46 while being rotated with rotating apparatus 16. This rotating can provide for the rounding of material 14 as it is cut by cutting tool 18. As it is cut by cutting tool 18, material is removed from material 14, leaving product material to be received by opening 66 of portion 42. This product material is rounded to a certain degree, and as it is rounded, it can be provided to within opening 66, which in exemplary embodiments, can be smaller than opening 46. According to exemplary embodiments, opening 46 can be referred to as an entrance opening, and opening 66 can be referred to as a receiving opening.

Referring to groove 68, like groove 48 of entrance portion 40, groove 68 can extend the length of base 64 and within to opening 66 in certain embodiments. In other embodiments, groove 68 can be configured to only extend partially within receiving portion 42. In certain exemplary embodiments, groove 68 can be configured to receive cutting tool 18 of apparatus 12 when assembly 10 is mounted to apparatus 12. Both bases 44 and 64 can be substantially flat in certain embodiments, or as described above, base 64 can likewise have projections configured to be received by openings within surface 20 of cutting apparatus 12. The projections of Bases 44 and 64 can be configured to mate with openings in the surface of apparatus 12. For example, the mating of the projections can align the openings 46 and 66 when assembly 10 is mounted to apparatus 12. In alternative embodiments, surface 20 can be configured with projections to extend within openings within bases 44 and 64, for example.

As described previously, the cross section of opening 46 can have an area, and this area can be larger than the cross section of opening 66. Cutting assembly 10 and its portions, at least in whole or in part, can be comprised of wood, for example. Cutting assembly 10 can also be manufactured of metal and/or composite materials such as Bakelite or other polymeric/resin materials. In exemplary embodiments, a person of ordinary skill in the art will appreciate that certain materials lend themselves to the fabrication of wood materials, where certain materials tend to bind or may be inappropriate for use in conjunction with rotating cutting tools. A cutting apparatus and/or techniques may dictate that materials such as steel or other hardened materials may be used to fabricate cutting assembly 10. However, with this being said, it may be preferred to utilize materials such as wood and other softer materials that will allow for the intermittent contact of the materials with a cutting tool such as cutting tool 18. According to exemplary embodiments, portions of cutting assembly 10 may not necessarily need to be wood and/or polymeric materials or resin materials such as Bakelite. Those materials include but are not limited to entrance portion 40 as well as separation guides 54, which may or may not come into contact with the cutting tool of the apparatus.

Assembly 10 can include sets of portions 40 and 42. Portions 40 and 42 of these sets can be interchanged with other portions of other sets. As an exemplary set, assembly 10 can include portion 40 having an opening 46, and a portion 42 having an opening 66. This set of portions 40 and 42 having openings 46 and 66 respectively, can be configured to round a piece of material having a certain size. Exemplary sets of portions 40 and 42 configured to round material are shown in Tables 1 and 2 below.

TABLE 1

| Exemplary Sets of Entrance and Receiving Portions | | | | | | | | | |
|---|---|---|---|---|---|---|---|---|---|
| | SET 1 | SET 2 | SET 3 | SET 4 | SET 5 | SET 6 | SET 7 | SET 8 | SET 9 |
| RPO† | 1/8" | 3/16" | 1/2" | 3/8" | 1/2" | 5/8" | 3/4" | 7/8" | 1" |
| EPO† | 7/16" | 1/2" | 5/8" | 3/4" | 1" | 1 1/8" | 1 3/8" | 1 5/8" | 1 3/4" |
| MCS† | 1/4" | 5/16" | 3/8 | 1/2" | 5/8" | 3/4" | 7/8" | 1" | 1 1/8" |

Receiving Portion Opening (RPO),
†Entrance Portion Opening (EPO), Material Cross-Section (MCS)

TABLE 2

| Exemplary Sets of Entrance and Receiving Portions | | | | | |
|---|---|---|---|---|---|
| | SET 10 | SET 11 | SET 12 | SET 13 | SET 14 |
| RPO† | 1 1/4" | 1 3/8" | 1 1/2" | 1 3/4" | 2" |
| EPO† | 2" | 2 1/8" | 2 3/8" | 2 3/4" | 3 1/4" |
| MCS† | 1 3/8" | 1 1/2" | 1 5/8" | 1 7/8" | 2 1/4" |

Receiving Portion Opening (RPO),
†Entrance Portion Opening (EPO), Material Cross-Section (MCS)

According to exemplary embodiments, portions 40 and 42 respectively can be at least about 5" wide at their base, about 2" to about 2½" and even 4" in height, and approximately at least 3" long/deep. Openings 46 and 66 can be defined about center width of the portions. Guides 54 can be approximately 1¼" wide, 1¼" tall, and about 2" long/deep. Guides 54 and portions 40 and 42 can be configured with a connecting opening 45 configured to enable the alignment of the guides and portions. According to exemplary embodiments, connecting openings 45 can be approximately 3/8" in cross-section diameter. Portions of sets may be interchanged with portions of other sets. For example, portion 42 of set 1 may be used with portion 40 of set 2 to accommodate a piece of material larger than 7/16" and produce a product piece having a rounded cross-section less than about 1/4".

Figure 3:
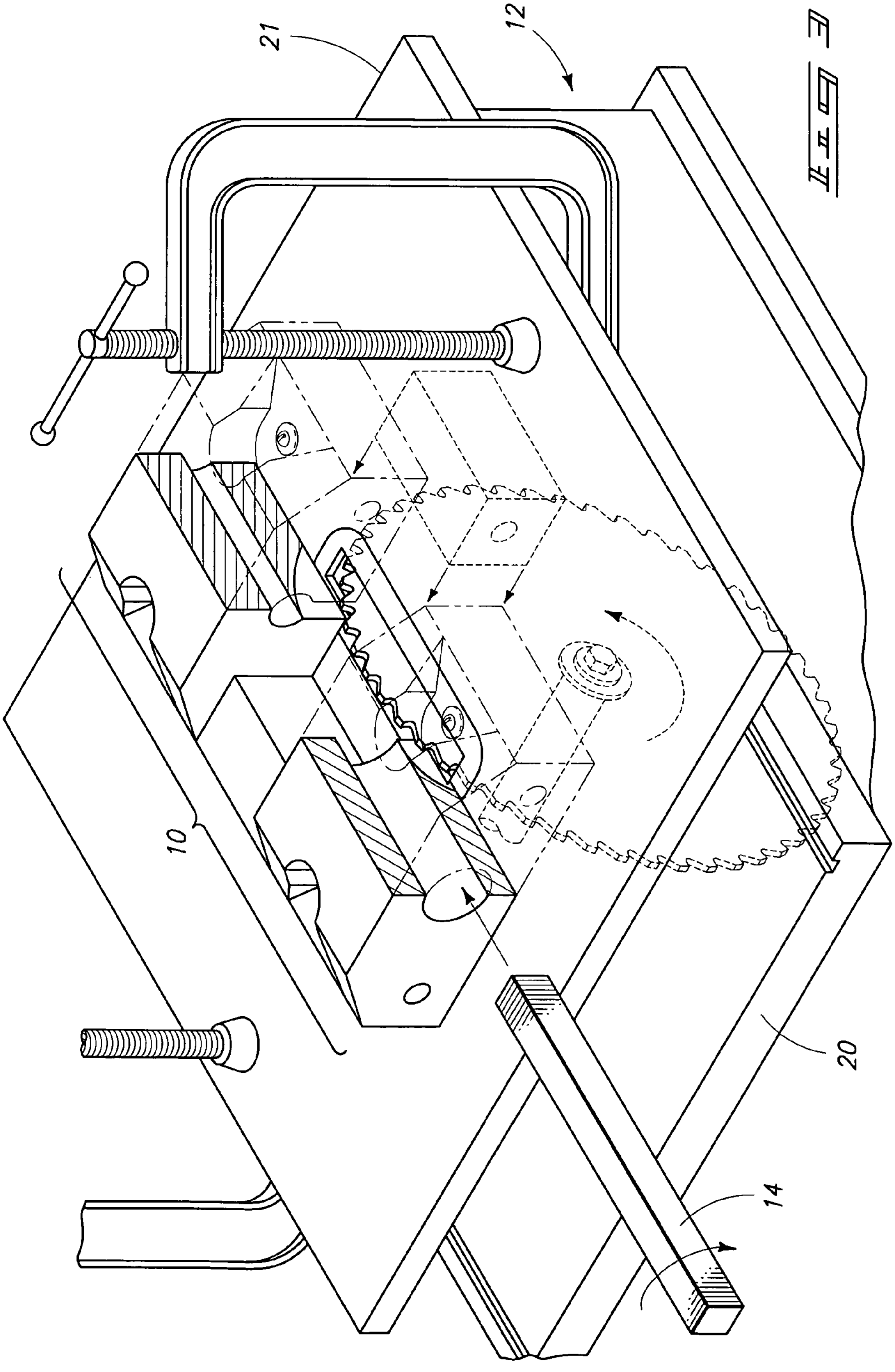
FIG. 3 is the cutting assembly of FIG. 1 according to an embodiment.
Figure 4:
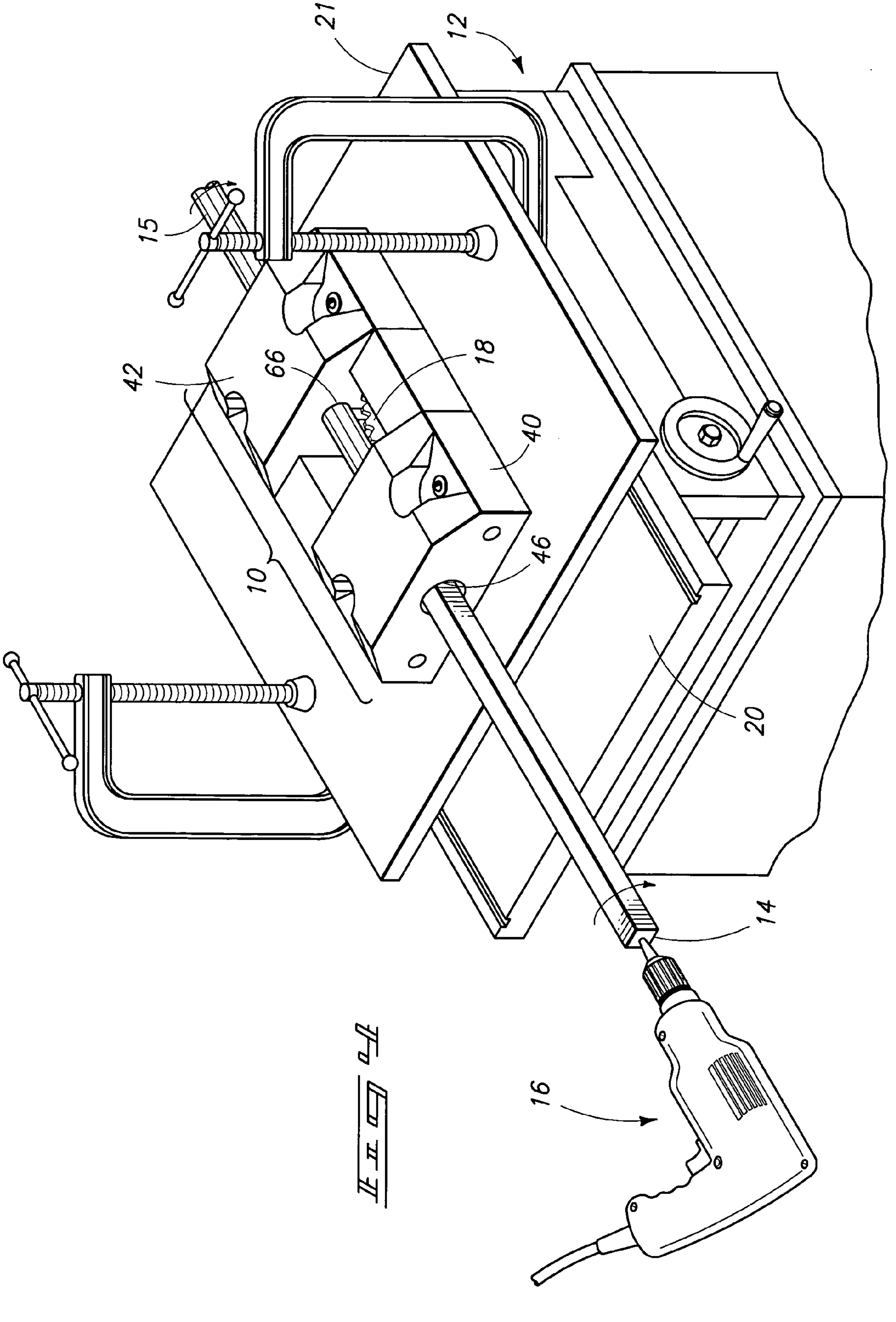
FIG. 4 is the cutting assembly of FIG. 1 according to an embodiment.

Referring to FIG. 3, in an exemplary depicted embodiment, cutting assembly 10 can include and/or be mounted to a cutting apparatus mounting assembly 21. Cutting assembly 10 may be mounted to mounting apparatus 21 via typical attachment devices, such as screws and/or bolts. Mounting apparatus 21 then may also be rigidly affixed to cutting apparatus 12, and more particularly to surface 20 of cutting apparatus 12. Exemplary attachment devices can include vices and/or other clamping devices that may rigidly affix mounting apparatus 21 to apparatus 12. According to exemplary embodiments, assembly 10 may be rigidly affixed to mounting apparatus 21, thereby rigidly affixing cutting assembly 10 to cutting apparatus 12. As shown in FIG. 3, material 14 can include corners in a cross-section perpendicular to its longitudinal axis, for example. Referring to FIG. 4, material 14 can be provided to within opening 46 of entrance portion 40 utilizing a rotating device 16 and rotating material 14 in a direction around the longitudinal axis of material 14. Material 14 can be provided in the direction of its longitudinal axis substantially opposite to the rotating direction of cutting tool 18. Upon passing by cutting tool 18, material of material 14 can be removed, thereby providing a rounded material that is received by receiving portion 42 within opening 66 and providing a substantially rounded piece of material 15 exiting receiving portion 42.

Figure 5:
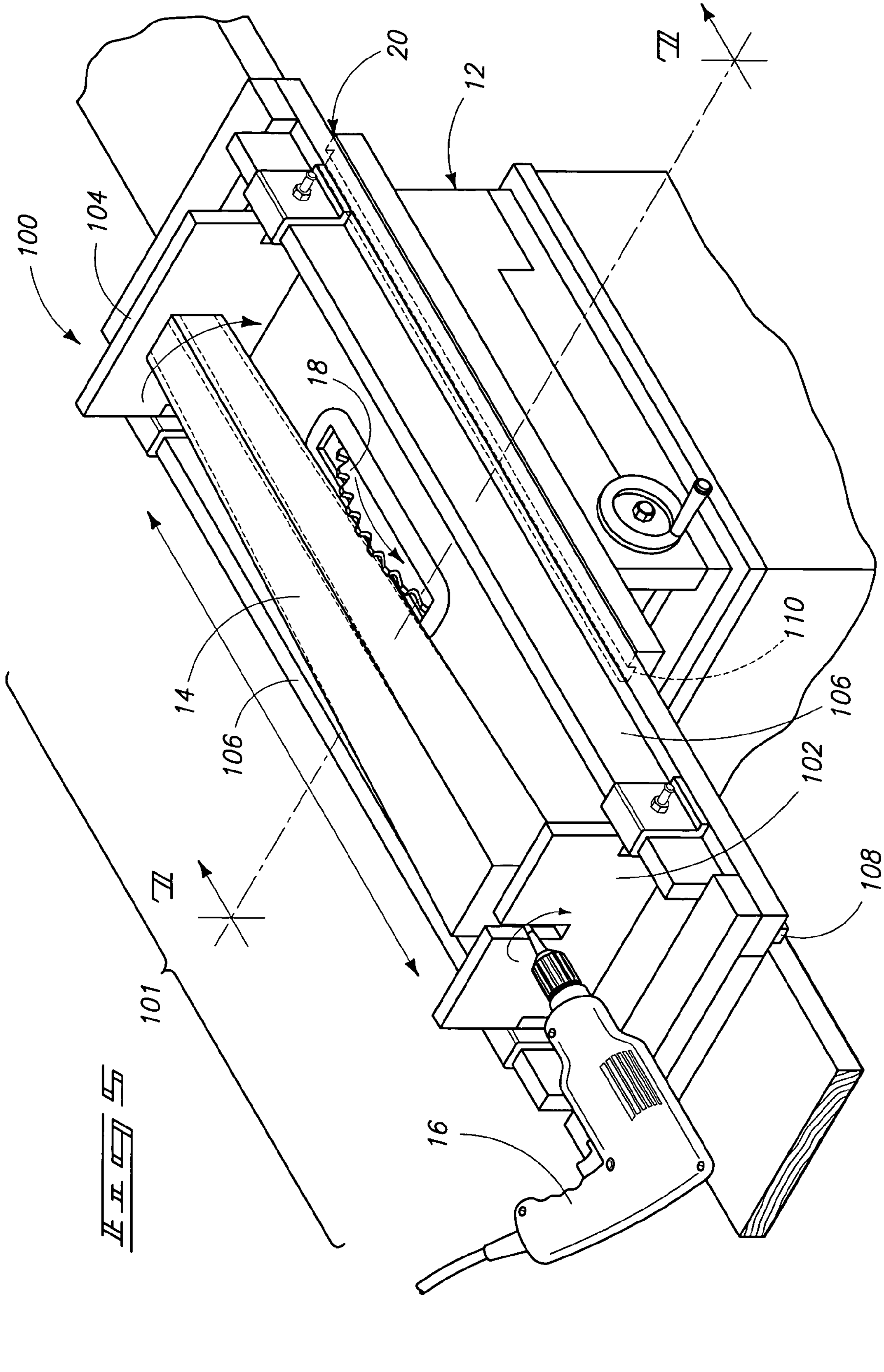
FIG. 5 is a cutting assembly according to an embodiment.

Referring to FIG. 5, cutting assembly 100 is shown that can be configured to provide material 14 within a carriage 101 configured to be slidably coupled to surface 20 of cutting apparatus 12. Cutting assembly 100 can include a mounting portion 102 coupled to a mounting portion 104. In exemplary embodiments, mounting portion 102 can be referred to as the first mounting portion, and mounting portion 104 can be referred to as the second mounting portion. These mounting portions can be part of and/or be coupled to carriage 101 via guides 106 extending there between. In exemplary embodiments, mounting portions 102 and 104 can be coupled to guides 106 via typical fasteners such as nuts, screws, or bolts. It is contemplated that carriage 101 may also be fabricated out of a solid piece of material, and need not be multiple pieces. According to exemplary embodiments, utilizing guides 106 allows for the processing of material 14 having varying lengths and/or widths. For example, for shorter pieces of material 14, or pieces of material 14 having smaller lengths, mounting portions 102 and 104 can be slidably coupled to guides 106 and allow for the coupling of portions 102 and 104 in relation to one another having differentiating distances there between. Slidably coupling portions 102 and 104 to guides 106 allows for the adjustment of portions 102 and 104 in relation to one another to accommodate material 14 of differing lengths.

As described previously, assembly 100 can be configured to be borne by cutting apparatus 12. In exemplary embodiments, assembly 100 can include a projection configured to fit within openings 110 of surface 20 of cutting apparatus 12. Exemplary projections can include projection 108 can be configured to be received within opening 110 of surface 20, thereby allowing for assembly 100 to be slidably coupled to cutting apparatus 12 according to exemplary embodiments. Assembly 100 can be configured to be moveable along surface 20 relative to cutting tool 18 of cutting apparatus 12, for example. As previously described, material 14 can have a longitudinal axis. According to exemplary implementations, material 14 can be rotated around this longitudinal axis, and material can be provided to cutting tool 18 in a direction substantially opposite to the rotation of cutting tool 18 within material carriage 101 along the longitudinal axis of material 14.

Figure 6:
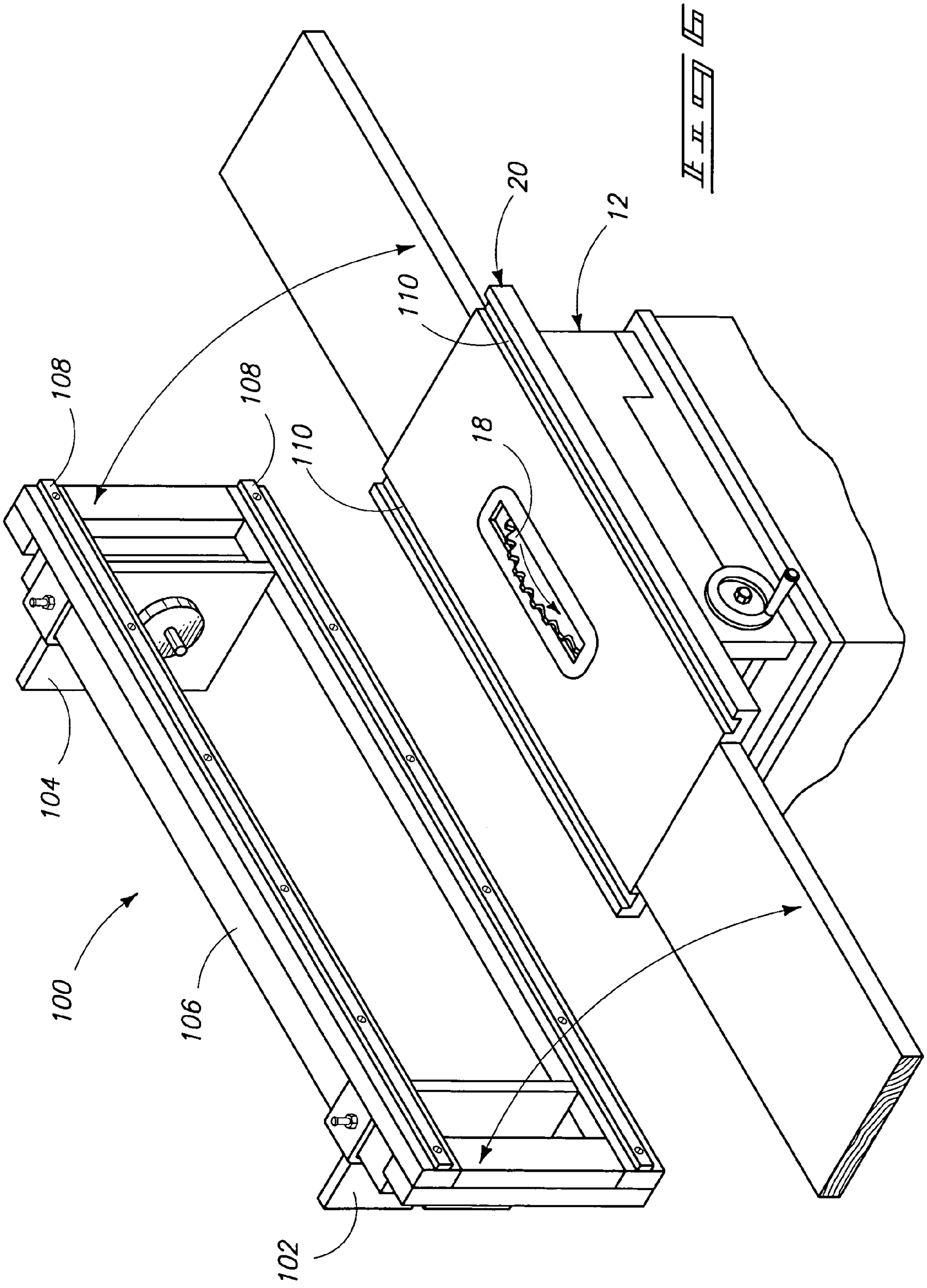
FIG. 6 is the cutting assembly of FIG. 5 according to an embodiment.
Figure 7:
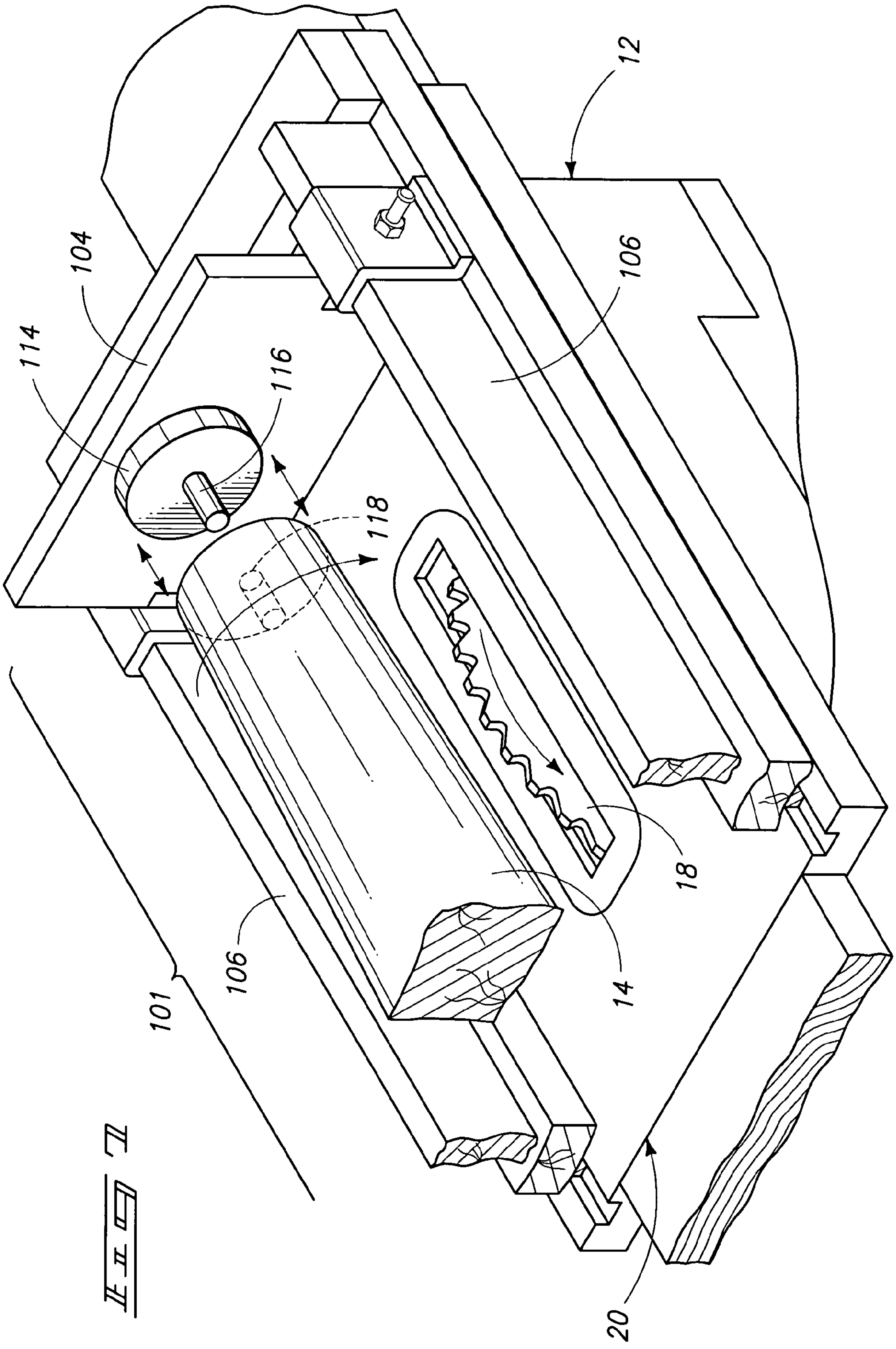
FIG. 7 is the cutting assembly of FIG. 5 according to an embodiment.

Referring to FIG. 6, for example, projections 108 can extend from the lower portions of assembly 100. Projections 108 can be configured to be received by openings 110. In exemplary embodiments, the receipt of projections 108 within openings 110 can align the assembly with cutting tool 18 of apparatus 12. The receipt of projections 108 within openings 110 can also align the longitudinal axis of material 14 in substantially the opposite direction of the rotation of cutting tool 18. Referring to FIG. 7, carriage 101 can include a mounting apparatus 114 coupled to mounting portion 104. In exemplary embodiments, mounting apparatus 114 can be configured as an extension 116 in the form of a dowel or pin configured to be received within an opening 118 of material 14. Extension 116 can be rotatably mounted to portion 104 allowing for the rotation of extension 116 around the longitudinal axis of material 14 when coupled thereto. According to exemplary embodiments, pin 116 and opening 118 configuration can also be reversed wherein a pin can be inserted into material 14 and mounting portion 104 can be configured with an opening to receive the pin of material 14. Other configurations that allow for the rotation of material 14 around its longitudinal axis while being substantially rotatably mounted to mounting portion 104 are contemplated.

Figure 8:
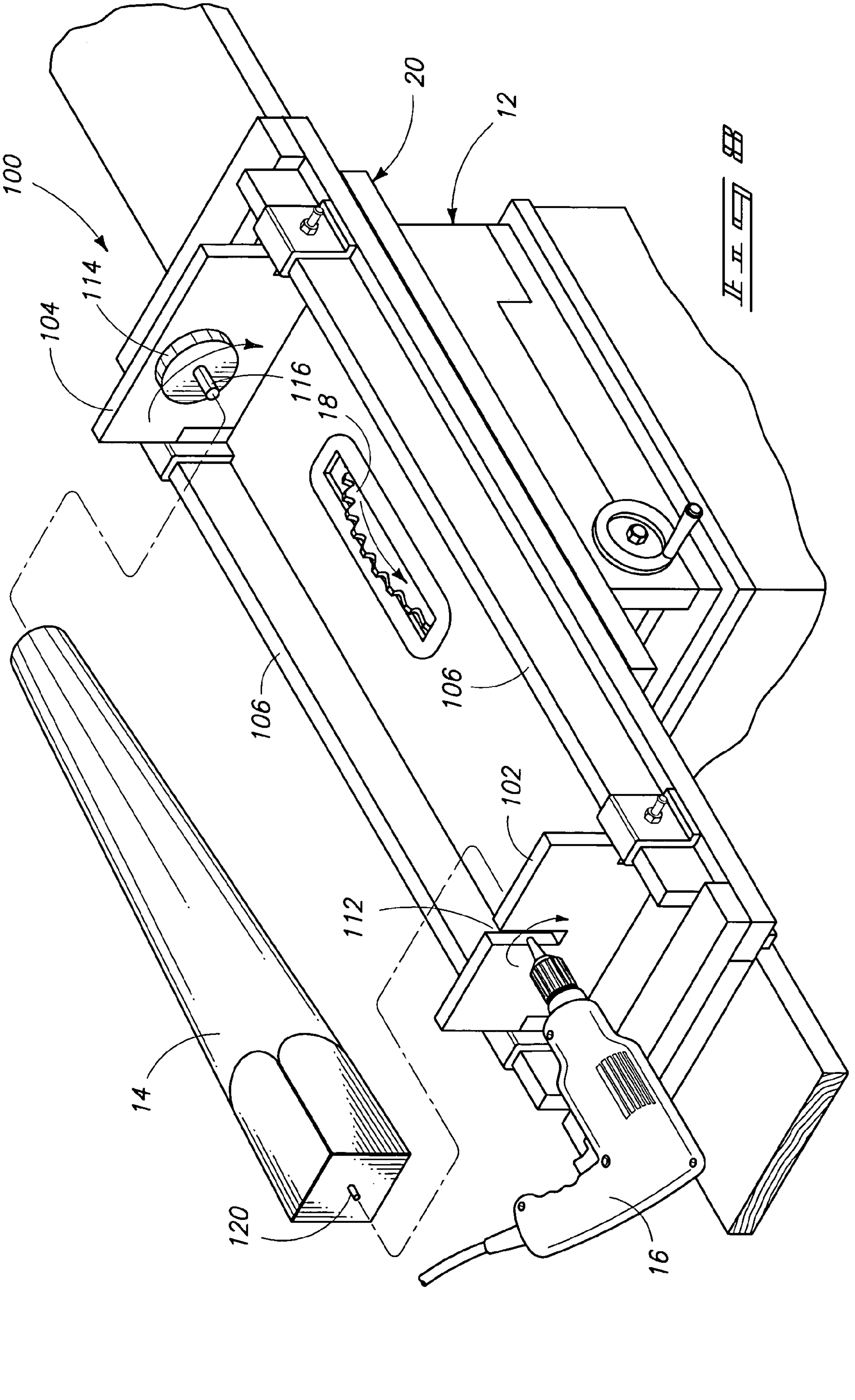
FIG. 8 is the cutting assembly of FIG. 5 according to an embodiment.

Referring to FIG. 8, mounting portion 102 can be configured with a mounting apparatus 112 configured to receive a pin 120 coupled to material 14. Mounting apparatus 112 can be configured as a groove extending within mounting portion 102, for example. Mounting apparatus 112 may also include a support coupled to portion 102 within opening 112 that substantially affixes the height of pin 120 in relation to mounting portion 102. In exemplary embodiments, mounting apparatus 114 of portion 104 may be aligned with mounting apparatus 112 of portion 102 along a horizontal plane. According to other exemplary embodiments, to fabricate rounded portions along material 14, the alignment of apparatus 114 and 112 may be aligned vertically in relation to one another as well. The vertical alignment of apparatus 114 and 112 may be juxtaposed to allow for the tapering of material 14 along its axis, for example. According to exemplary embodiments, apparatus 112 of portion 102 can, rather than including an opening groove from the upper surface of portion 102 into portion 102, include varying holes within portion 102 to receive pin 120 of material 14. These varying openings (not shown) can provide for predetermined tapers as they are aligned with mounting apparatus 114. Apparatus 112 can also include a slot as described extending from an upper portion of mounting portion 102 toward to the base of portion 102.

According to exemplary implementations, the positioning of the proximal and distal ends of material 14 within carriage 101 can also be accomplished by aligning portions 102 and 104. For example, portions 102 and 104 may be slidably coupled to guides 106. In exemplary implementations portions 102 and 104 may be raised or lowered with respect to one another to align the mounting apparatus of each with one another or juxtapose the mounting apparatus of each with one another. For example, portions 102 and 104 may each be configured with a fixed mounting apparatus and the raising and/or lowering of portions 102 and/or 104 with respect to guides 106 can facilitate the alignment of these fixed mounting apparatus as desired by the operator to achieve a desired product material.

According to exemplary embodiments, material 14 can be provided to within carriage 101, and carriage 101 is slidably coupled to cutting apparatus 12. Material 14 can be delivered to cutting apparatus 12 via sliding carriage 101 in a direction substantially opposite to the rotation of cutting tool 18. According to exemplary embodiments, portion 104 can engage the distal end of material 14, and portion 102 can engage the proximate end of material 14. As mounted to portion 104 and 102, the ends of material 14 can be juxtaposed from one another in the vertical axis, and/or in the horizontal axis.

According to exemplary embodiments, carriage 101 can be at least about 4' in length, from about 8 to 10" in width and about 6" in height. Apparatus 12 may be equipped with extensions, extending from both the proximate and distal ends of the apparatus to receive assembly 100 as it progresses from the proximate end to the distal end of the apparatus. The assembly can also be equipped with a handle to allow the operator to control the movement of the assembly across the surface of the apparatus. The handle can extend outwardly away from an exterior surface of a guide, for example.

Figure 9:
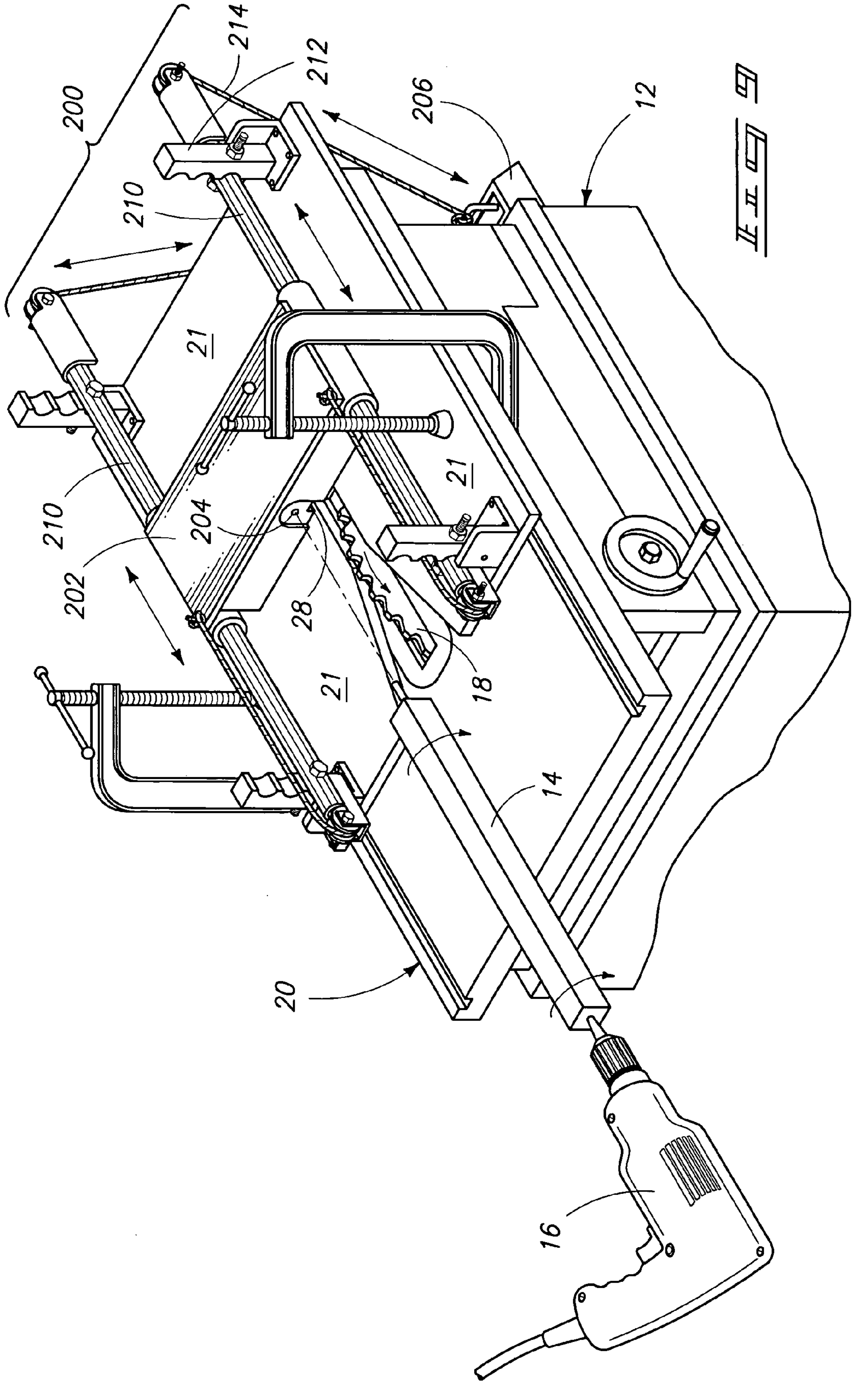
FIG. 9 is a cutting assembly according to an embodiment.
Figure 10:
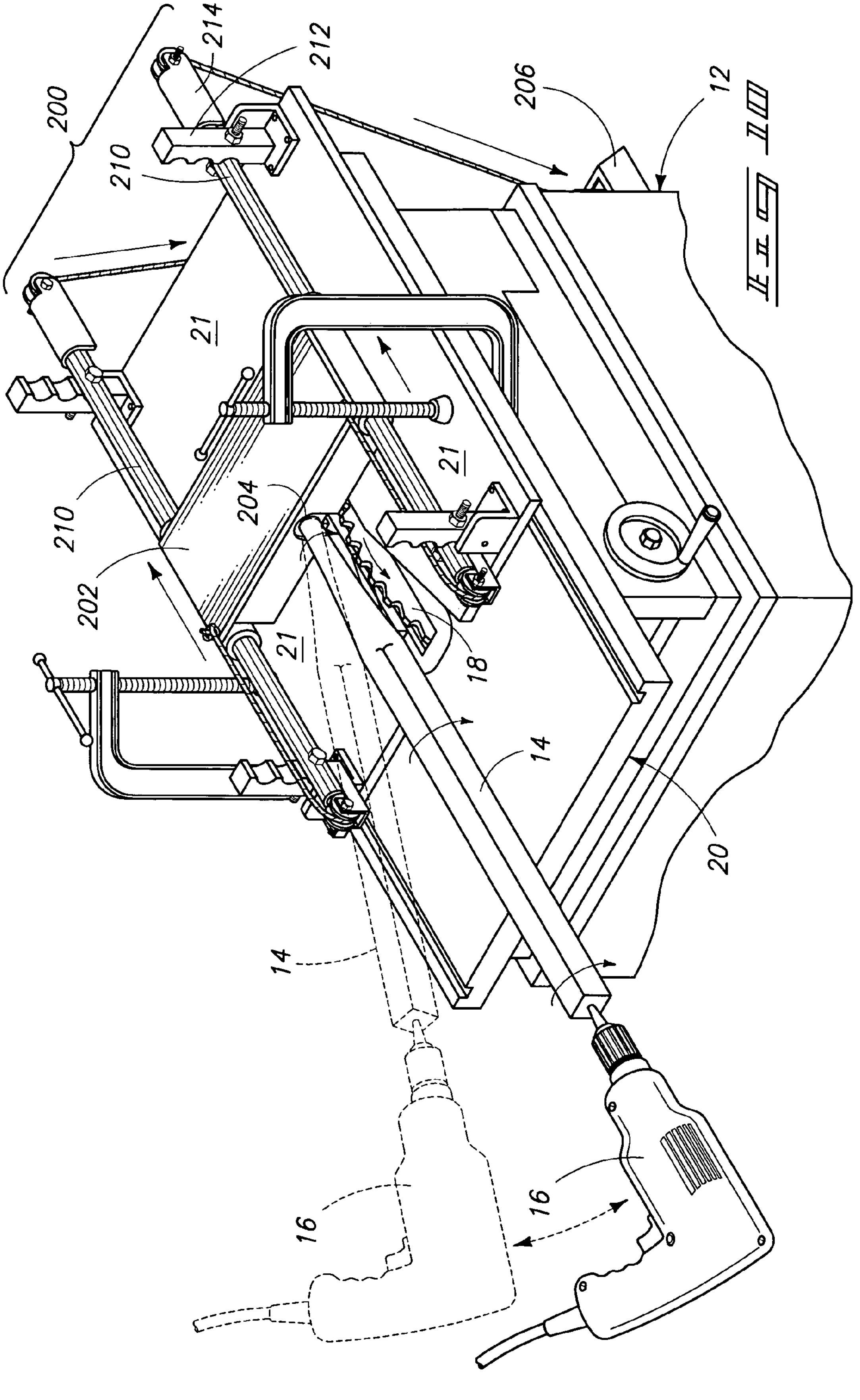
FIG. 10 is the cutting assembly of FIG. 9 according to an embodiment.
Figure 11:
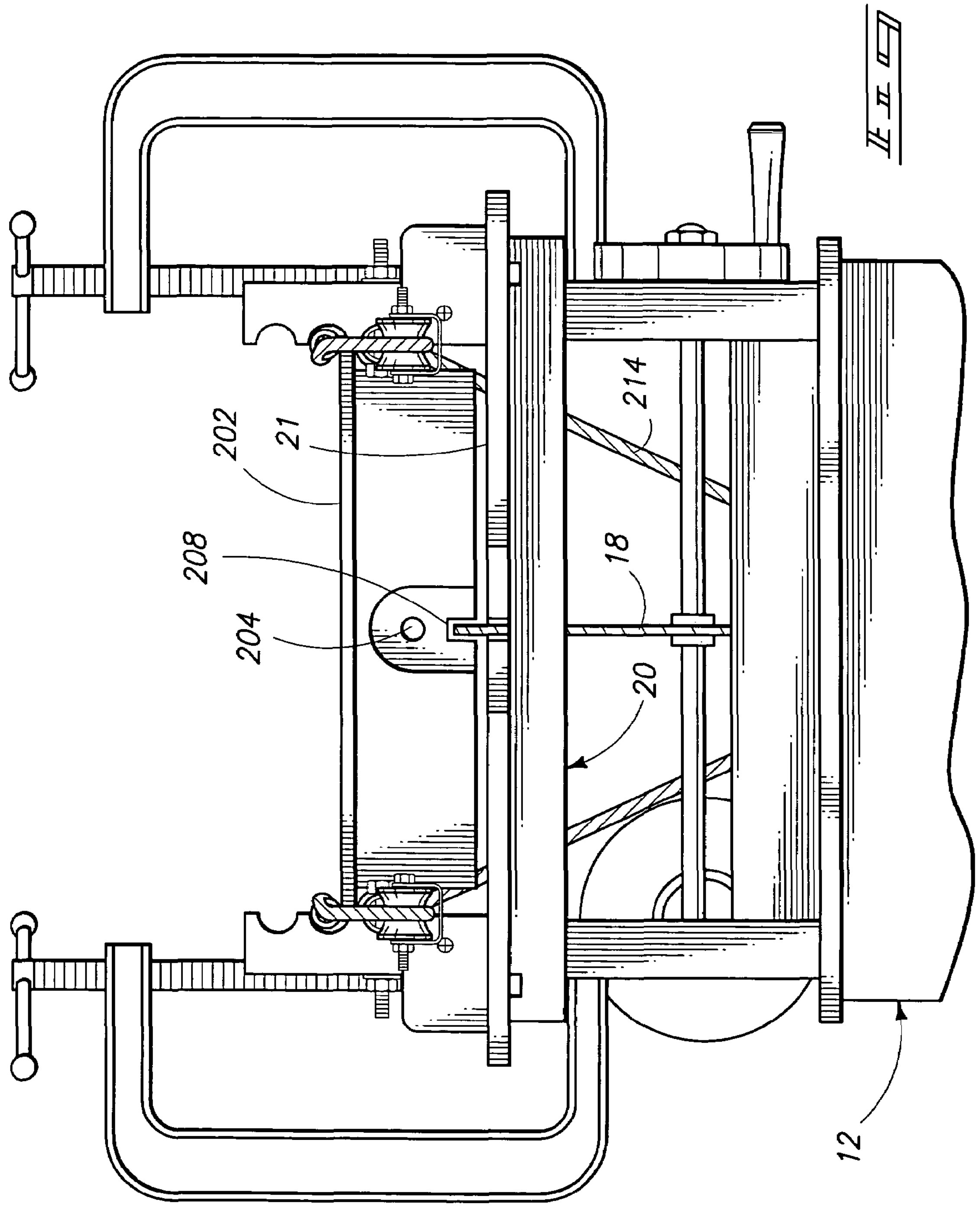
FIG. 11 is the cutting assembly of FIG. 9 according to an embodiment.

According to another exemplary embodiment depicted in FIGS. 9-11, cutting assembly 200 of FIG. 9 can include a material receiving portion 202 that is configured to be slidably mounted to surface 20 of cutting apparatus 12. Receiving portion 202 can include a material receiving apparatus 204 that is configured to couple to material 14. Apparatus 204 can be configured to allow material 14 to rotate around an axis of material 14, with the axis of material 14 extending to apparatus 204. Apparatus 204 as described above can be an apparatus such as a pin extending from portion 202 to be received by an opening within material 14, and/or an opening within receiving portion 204 to receive a pin or an extension from material 14.

Assembly 200 can be configured to include receiving portion 202 slidably coupled to guides 210. In the exemplary depicted embodiment, guides 210 can be referred to as rods being received by openings forming pipes of portion 202. Portion 202 can be configured to progress along these guides from a point proximate cutting tool 18 to another point in relation to cutting tool 18, for example. Guides 210 of assembly 200 can be coupled to extensions 212. Extensions 212 can be coupled to assembly 21. Extensions 212 can be configured to allow for raising and lowering of guides 210 in relation to assembly 21. For example, extensions 212 may be configured as shown with varying grooves to receive the guides. In exemplary embodiments the grooves can be configured to mate with the outline of the guides. Where the guides are in the form of a pipe, the grooves may be rounded, for example. Grooves of extensions 212 can be aligned with one another to configure the guides substantially parallel to assembly 21 in exemplary embodiments. For example the guides can be 1" pipes and the grooves of the extensions can about 1½", 2½", and 3½" above assembly 21. According to other embodiments, extensions 212 can be configured to slidably mount guides 210. For example, guides 210 may be configured with an opening to which can be affixed a bolt that is received through a groove in extension 212.

Assembly 21 can be configured to be rigidly affixed to apparatus 12 according to exemplary embodiments. Extensions (not shown) can be provided in the lower portion or even base of assembly 21 to couple with openings in the upper or even cutting surface of apparatus 12. According to exemplary implementations, receiving the extensions of assembly 21 within the openings of the surface of apparatus 12 can align assembly 200 with cutting tool 18. Assembly 200 can be rigidly affixed to apparatus 12 using vices, clamps, or other affixing devices.

Portion 202 can be biased in the direction of cutting tool 18 according to exemplary embodiments. For example, tension cords 214 can extend from a weight 206 over a pulley through guides 210, over another pulley and to portion 202, biasing portion 202 in the direction of cutting tool 18. According to exemplary implementations, weight 206 can be from about 5 to about 7 lbs. Other biasing apparatus are contemplated. For example, one or springs can be coupled to portion 202 and one or more of extensions 212 biasing portion 202 in the direction of cutting tool 18.

According to exemplary implementations, material 14 can be coupled to apparatus 204 and rotated around its longitudinal axis with rotating apparatus 16. The operator can provide material 14 against the biasing of portion 202 removing portions of material 14. According to exemplary embodiments, the biasing of portion 202 can allow the operator to control the position of material 14 in relation to tool 18. The positioning of material 14 in relation to tool 18 can provide for the non-uniform rounding of portions of material 14.

For example, referring to FIG. 10, the mating of apparatus 204 with material 14 can be configured to rigidly align material 14 in a direction substantially opposite to the rotation of cutting tool 18 according to exemplary embodiments, and according to other embodiments, the coupling of material 14 and apparatus 204 can allow for substantial movement in the horizontal and/or vertical planes of material 14 while being provided to cutting apparatus 12. For example, and by way of example only, material 14 may be provided to cutting tool 18, and material 14 may be raised, lowered, or moved from side-to-side to allow for differing depths of rounding within material as it extends along the axis of material 14. For example, and by way of example only, material 14 can be provided only partially along its longitudinal axis while being coupled in relation to cutting tool 18 along either one or more of any angle relating to the vertical or horizontal planes. As material 14 is rotated utilizing rotating apparatus 16, for example, the ends or an entirety of material 14 can be rounded in relation to its previously ungrounded state. According to exemplary implementations, material 14 can be fashioned to include tennons using assembly 200.

Referring to FIG. 11, an exemplary cross section view of apparatus 200 is shown. As depicted, groove or opening 208 is configured to receive cutting tool 18. Receiving portion 202 is configured with apparatus 204 to receive an extension and/or couple to material 14 upon receipt. Tension cords 214 can extend through pulleys to portion 202 to bias portion 202 in a direction towards the front portion of cutting tool 18.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A cutting assembly comprising:

an entrance portion having a first base, and defining an entrance opening configured to receive a piece of material within the opening, the first base of the entrance portion being configured to be mounted to the upper surface of a multi-toothed cutting apparatus; and a receiving portion having a second base, and defining a receiving opening configured to be axially aligned with the entrance opening of the entrance portion when mounted to the upper surface of the multi-toothed cutting apparatus, and wherein the second base of the receiving portion comprises a substantially flat bottom surface and a groove extending at least partially into the substantially flat bottom surface of the second base, the groove configured to receive a cutting tool of the multi-toothed cutting apparatus when the receiving portion is mounted to the upper surface.

2. The cutting assembly of claim 1 wherein both the first and second bases comprise substantially flat bottoms configured to be mounted to the upper surface of the multi-toothed cutting apparatus.

3. The cutting assembly of claim 1 further comprising a separation guide connecting the entrance portion to the receiving portion.

4. The cutting assembly of claim 1 wherein an entrance area of the entrance opening defined by the entrance portion is larger than a receiving area of the receiving opening defined by the receiving portion.

5. The cutting assembly of claim 1 wherein the receiving portion comprises a proximal side opposite a distal side, the groove extending from the proximal side to the substantially flat bottom surface of the second base.

6. The cutting assembly of claim 5 wherein the groove extends to the receiving opening.

7. The cutting assembly of claim 1 wherein the multi-toothed cutting apparatus includes a multi-toothed cutting tool, the multi-toothed cutting tool having greater than four teeth.

8. The cutting assembly of claim 7 wherein the cutting apparatus is configured to rotate the cutting tool toward the entrance portion and away from the receiving portion.

9. The cutting assembly of claim 1 wherein one or both of the entrance and receiving portions comprise wood.

* * * * *

UNITED STATES PATENT AND TRADEMARK OFFICE
CERTIFICATE OF CORRECTION

PATENT NO. : 7,591,062 B2
APPLICATION NO. : 11/357003
DATED : September 22, 2009
INVENTOR(S) : James Rogers It is certified that error appears in the above-identified patent and that said Letters Patent is hereby corrected as shown below:

Column 2, Line 52 – Replace “promote”” with --promote--.

Column 6, Table 1, Line 1 Under SET 3 – Replace “½"” with --1/4"--.

Column 9, Line 56 – Replace “can about” with --can be about--.

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,591,062 B2
APPLICATION NO. : 11/357003
DATED : September 22, 2009
INVENTOR(S) : James Rogers It is certified that error appears in the above-identified patent and that said Letters Patent is hereby corrected as shown below:

Column 2, Line 55 – Replace “methods at” with --methods that--.

Column 10, Line 42 – Replace “ungrounded” with --un-rounded--.

Signed and Sealed this

Fifth Day of October, 2010

David J. Kappos

David J. Kappos
*Director of the United States Patent and Trademark Office*